US008103820B2

(12) United States Patent
Yeh et al.

(10) Patent No.: US 8,103,820 B2
(45) Date of Patent: Jan. 24, 2012

(54) WEAR LEVELING METHOD AND CONTROLLER USING THE SAME

(75) Inventors: Chih-Kang Yeh, Kinmen County (TW); Chien-Hua Chu, Hsinchu County (TW)

(73) Assignee: Phison Electronics Corp., Miaoli (TW)

( * ) Notice: Subject to any disclaimer, the term of this patent is extended or adjusted under 35 U.S.C. 154(b) by 987 days.

(21) Appl. No.: 12/047,127

(22) Filed: Mar. 12, 2008

(65) Prior Publication Data

US 2009/0172255 A1 Jul. 2, 2009

(30) Foreign Application Priority Data

Dec. 31, 2007 (TW) ................................ 96151509 A

(51) Int. Cl.
*G06F 12/02* (2006.01)

(52) U.S. Cl. ........................................................ 711/103

(58) Field of Classification Search .................. 711/103
See application file for complete search history.

(56) References Cited

U.S. PATENT DOCUMENTS 7,937,521 B2 * 5/2011 Reid ............................ 711/100
2005/0223186 A1 10/2005 Belevich et al.
2006/0171210 A1 * 8/2006 Nagashima et al. ..... 365/189.01
2007/0050536 A1 3/2007 Kolokowsky

FOREIGN PATENT DOCUMENTS

CN 1701389 11/2005

* cited by examiner

*Primary Examiner* — Jared Rutz
(74) *Attorney, Agent, or Firm* — J.C. Patents

(57) ABSTRACT

A wear leveling method for a multi level cell (MLC) NAND flash memory is provided. The flash memory includes a first zone and a second zone respectively having a plurality of blocks, wherein each of the blocks includes an upper page and a lower page. The wear leveling method includes: respectively determining whether to start a block swapping operation of a wear leveling process in the first zone and the second zone of the flash memory according to different start-up conditions; and respectively performing the block swapping operation in the first zone and the second zone, wherein the blocks in the first zone are accessed by using only the lower pages, and the blocks in the second zone are accessed by using both the upper pages and the lower pages. Thereby, the lifespan of the flash memory is effectively prolonged and meaningless consumption of system resources is avoided.

35 Claims, 9 Drawing Sheets

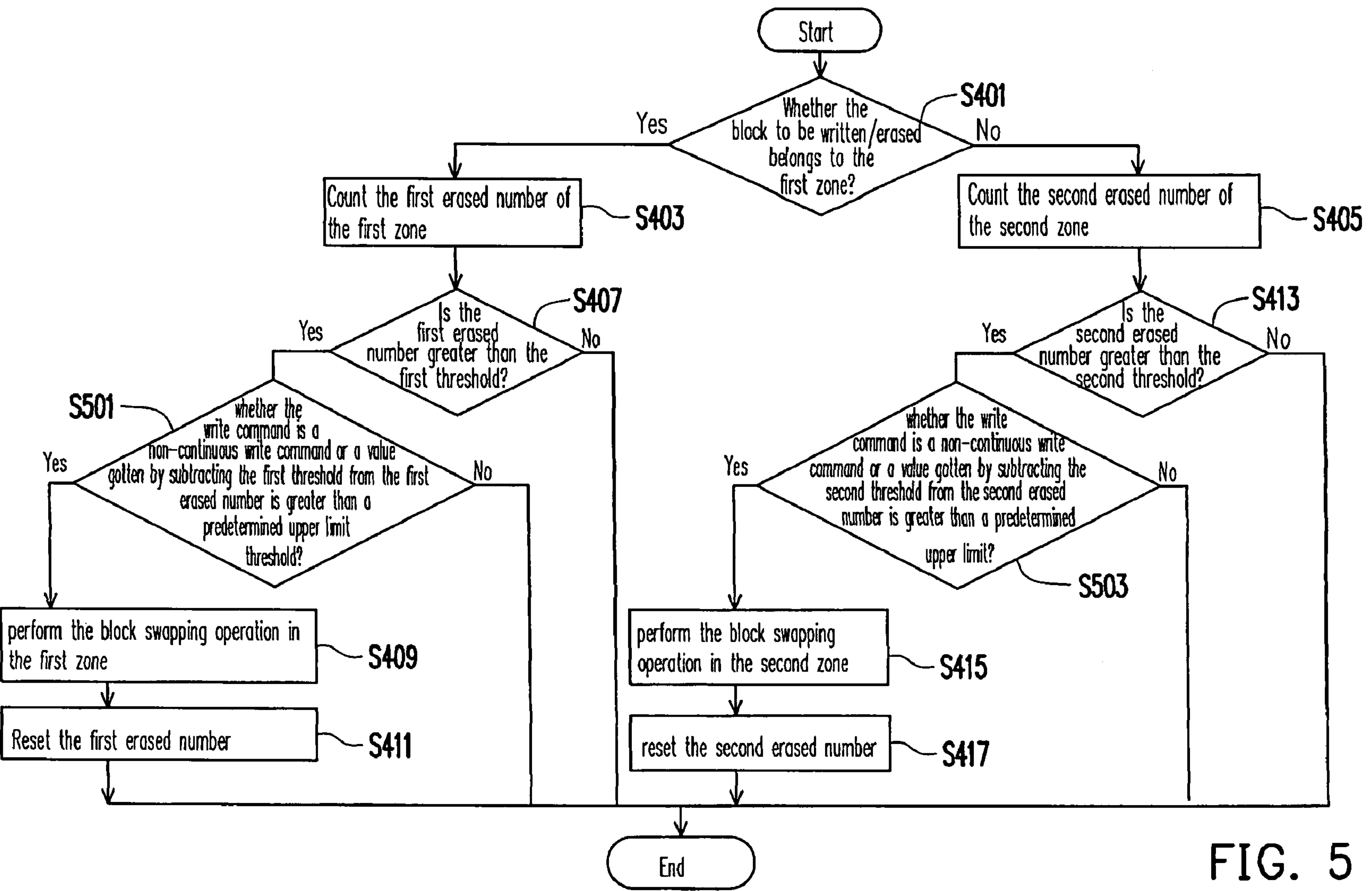
Start
Whether the block to be written/erased belongs to the first zone?
S401
Yes
No
Count the first erased number of the first zone
S403
Count the second erased number of the second zone
S405
Is the first erased number greater than the first threshold?
S407
Is the second erased number greater than the second threshold?
S413
whether the write command is a non-continuous write command or a value gotten by subtracting the first threshold from the first erased number is greater than a predetermined upper limit threshold?
S501
whether the write command is a non-continuous write command or a value gotten by subtracting the second threshold from the second erased number is greater than a predetermined upper limit?
S503
perform the block swapping operation in the first zone
S409
Reset the first erased number
S411
perform the block swapping operation in the second zone
S415
reset the second erased number
S417
End
FIG. 5

WEAR LEVELING METHOD AND CONTROLLER USING THE SAME

CROSS-REFERENCE TO RELATED APPLICATION

This application claims the priority benefit of Taiwan application serial no. 96151509, filed on Dec. 31, 2007. The entirety of the above-mentioned patent application is hereby incorporated by reference herein and made a part of this specification.

BACKGROUND

1. Technology Field

The present invention generally relates to a wear leveling method, in particular, to a wear leveling method for a flash memory and a controller using the same.

2. Description of Related Art

Along with the widespread of digital cameras, camera phones, and MP3 in recently years, the consumers' demand to storage media has increased drastically too. Flash memory is one of the most adaptable memories for such battery-powered portable products due to its characteristics such as data non-volatility, low power consumption, small volume, and non-mechanical structure. Besides being applied in foregoing portable products, flash memory is also broadly applied to external products such as flash cards and flash drives. Thereby, flash memory has become one of the most focused electronic products in recent years.

Even though a flash memory can offer such advantages as data rewritability and power-free data storage, blocks in a flash memory can only be erased a limited number of times. For example, a block in a flash memory will be worn-out after being erased 10,000 times. Data loss may be caused when the storage capacity or performance of a flash memory is obviously deteriorated by its worn-out blocks.

The wear of a block in a flash memory is determined by the number of times this block is programmed or erased. In other words, the wear of a block is relatively low if the block is programmed (or written) only once; contrarily, the wear of a block grows higher when the block is programmed and erased repeatedly. For example, when a host keeps writing data into a flash memory by using the same logical block address (LBA), the block corresponding to the same physical block address (PBA) in the flash memory is then repeatedly written and erased.

Generally speaking, the existence of worn-out blocks will affect the performance of a flash memory even if the wear of other blocks is still relatively low. Besides the deterioration in the performance of the worn-out blocks, the performance of the entire flash memory is also reduced when the good blocks cannot provide enough space for storing data. In other words, when the number of worn-out blocks in a flash memory exceeds a threshold, the flash memory is considered unusable even there are still good blocks. In this case, those good blocks are wasted.

As described above, blocks in a flash memory should be used evenly in order to prolong the lifespan of the flash memory. Conventionally, a block swapping operation is performed after the flash memory has been accessed for a certain period so as to level the wear of the blocks. According to the conventional block swapping technique, the same block swapping rule is applied to all the blocks in a flash memory. However, blocks in a flash memory are usually grouped into different areas, and these areas are accessed in different manners therefore are worn out differently. Thus, meaningless system resource consumption may be caused by swapping all the blocks in a flash memory based on the same block swapping rule. Accordingly, a wear leveling method which can effectively prolong the lifespan of a flash memory and at the same time, can prevent meaningless consumption of system resources by considering the characteristics of different areas in the flash memory is desired.

SUMMARY

Accordingly, the present invention is directed to a wear leveling method and a controller using the same, wherein a wear leveling process is respectively executed to blocks having different programming manners in a multi level cell (MLC) NAND flash memory based on different start-up conditions so that the lifespan of the flash memory can be effectively prolonged and meaningless consumption of system resources can be avoided by considering the characteristics of different areas.

The present invention is directed to a wear leveling method and a controller using the same, wherein different wear leveling processes are respectively executed to blocks having different programming manners in a MLC NAND flash memory so that the lifespan of the flash memory can be effectively prolonged and meaningless consumption of system resources can be avoided by considering the characteristics of different areas.

The present invention is directed to a wear levelling method and a controller using the same, wherein a wear leveling process is respectively executed to different flash memories in a flash memory module based on different start-up conditions so that the lifespan of the flash memory module can be effectively prolonged and meaningless consumption of system resources can be avoided by considering the characteristics of different flash memories.

The present invention is directed to a wear leveling method and a controller using the same, wherein different wear leveling processes are respectively executed to different flash memories in a flash memory module so that the lifespan of the flash memory module can be effectively prolonged and meaningless consumption of system resources can be avoided by considering the characteristics of different flash memories.

The present invention provides a wear leveling method suitable for a MLC NAND flash memory. The MLC NAND flash memory includes a first zone and a second zone respectively having a plurality of blocks, wherein each of the blocks in the first zone and the second zone includes an upper page and a lower page. The wear levelling method includes: respectively determining whether to start a block swapping operation of a wear leveling process in the first zone and the second zone of the MLC NAND flash memory according to different start-up conditions; and respectively performing the block swapping operation in the first zone and the second zone, wherein the blocks in the first zone are accessed by using only the lower pages, and the blocks in the second zone are accessed by using both the lower pages and the upper pages.

According to an embodiment of the present invention, the start-up condition of the block swapping operation in the first zone is that a first erased number of the first zone is greater than a first threshold, and the start-up condition of the block swapping operation in the second zone is that a second erased number of the second zone is greater than a second threshold, wherein the first threshold is greater than the second threshold, and the corresponding first erased number or second erased number is reset after the block swapping operation is performed.

According to an embodiment of the present invention, when the start-up condition of the block swapping operation in the first zone is met, the block swapping operation is started in the first zone only when it is determined that a write command of a host is a non-continuous command or a value gotten by subtracting the first threshold from the first erased number is greater than a predetermined upper limit, and when the start-up condition of the block swapping operation in the second zone is met, the block swapping operation is started in the second zone only when it is determined that the write command of the host is a non-continuous command or a value gotten by subtracting the second threshold from the second erased number is greater than the predetermined upper limit.

According to an embodiment of the present invention, when the start-up condition of the block swapping operation in the first zone and the start-up condition of the block swapping operation in the second zone are both met, the block swapping operation is only started in the second zone.

According to an embodiment of the present invention, the block swapping operation includes moving a block linked to a data area of the MLC NAND flash memory to a spare area of the MLC NAND flash memory, moving a block linked to the spare area to the data area, and copying data in the block in the data area to the block in the spare area.

The present invention provides a wear leveling method suitable for a MLC NAND flash memory. The MLC NAND flash memory includes a first zone and a second zone respectively having a plurality of blocks, and each of the blocks in the first zone and the second zone includes an upper page and a lower page. The wear levelling method includes respectively executing a wear leveling process without resource consumption and a wear leveling process with resource consumption in the first zone and the second zone, wherein the blocks in the first zone are accessed by using only the lower pages, and the blocks in the second zone are accessed by using both the lower pages and the upper pages.

According to an embodiment of the present invention, the wear leveling process without resource consumption includes: counting a first erased number of the first zone; and when the first erased number is greater than a first threshold, moving a block in the first zone which is linked to a data area of the MLC NAND flash memory to a spare area of the MLC NAND flash memory, moving a block in the first zone which is linked to the spare area to the data area, and copying data in the block in the data area to the block in the spare area.

According to an embodiment of the present invention, the wear leveling process with resource consumption includes counting an erased number of each block in the second zone; counting a second erased number of the second zone; and when the second erased number is greater than a second threshold, moving a block in the second zone which is linked to the data area of the MLC NAND flash memory and has a relatively small erased number to the spare area of the MLC NAND flash memory, moving a block in the second zone which is linked to the spare area and has a relatively large erased number to the data area, and copying data in the block in the data area which has the relatively small erased number to the block in the spare area which has the relatively large erased number.

The present invention provides a wear leveling method suitable for a flash memory module having a first flash memory and a second flash memory. The wear levelling method includes: respectively determining whether to start a block swapping operation of a wear leveling process in the first flash memory and the second flash memory of the flash memory module according to different start-up conditions; and respectively performing the block swapping operation in the first flash memory and the second flash memory, wherein the first flash memory is a single level cell (SLC) NAND flash memory, and the second flash memory is a MLC NAND flash memory.

According to an embodiment of the present invention, the start-up condition of the block swapping operation in the first flash memory is that a first erased number of the first flash memory is greater than a first threshold, and the start-up condition of the block swapping operation in the second flash memory is that a second erased number of the second flash memory is greater than a second threshold, wherein the first threshold is greater than the second threshold, and the corresponding first erased number or second erased number is reset after the block swapping operation is performed.

According to an embodiment of the present invention, when the start-up condition of the block swapping operation in the first flash memory is met, the block swapping operation is started in the first flash memory only when it is determined that a write command of a host is a non-continuous command or a value gotten by subtracting the first threshold from the first erased number is greater than a predetermined upper limit, and when the start-up condition of the block swapping operation in the second flash memory is met, the block swapping operation is started in the second flash memory only when it is determined that the write command of the host is a non-continuous command or a value gotten by subtracting the second threshold from the second erased number is greater than the predetermined upper limit.

According to an embodiment of the present invention, when the start-up condition of the block swapping operation in the first flash memory and the start-up condition of the block swapping operation in the second flash memory are both met, the block swapping operation is only started in the second flash memory.

According to an embodiment of the present invention, the block swapping operation includes moving a block linked to a data area of the flash memory module to a spare area of the flash memory module, moving a block linked to the spare area to the data area, and copying data in the block in the data area to the block in the spare area.

The present invention provides a wear leveling method suitable for a flash memory module having a first flash memory and a second flash memory. The wear levelling method includes respectively executing a wear leveling process without resource consumption and a wear leveling process with resource consumption in the first flash memory and the second flash memory of the flash memory module, wherein the first flash memory is a SLC NAND flash memory, and the second flash memory is a MLC NAND flash memory.

According to an embodiment of the present invention, the wear leveling process without resource consumption includes: counting a first erased number of the first flash memory; and when the first erased number is greater than a first threshold, moving a block in the first flash memory which is linked to a data area of the first flash memory to a spare area of the first flash memory, moving a block in the first flash memory which is linked to the spare area to the data area, and copying data in the block in the data area to the block in the spare area.

According to an embodiment of the present invention, the wear leveling process with resource consumption includes: counting an erased number of each block in the second flash memory; counting a second erased number of the second flash memory; and when the second erased number is greater than a second threshold, moving a block in the second flash memory which is linked to the data area of the second flash memory and has a relatively small erased number to the spare area of the second flash memory, moving a block in the second flash memory which is linked to the spare area and has a relatively large erased number to the data area, and copying data in the block in the data area which has the relatively small erased number to the block in the spare area which has the relatively large erased number.

The present invention provides a controller suitable for a MLC NAND flash memory in a storage apparatus. The MLC NAND flash memory includes a first zone and a second zone respectively having a plurality of blocks, wherein each of the blocks in the first zone and the second zone includes an upper page and a lower page. The controller includes a flash memory interface, a buffer memory, a micro-processing unit, and a memory management module. The flash memory interface is electrically connected the micro-processing unit and used for accessing the MLC NAND flash memory. The buffer memory is electrically connected the micro-processing unit and used for temporarily storing data. The memory management module is electrically connected the micro-processing unit and respectively determines whether to start a block swapping operation of a wear leveling process in the first zone and the second zone of the MLC NAND flash memory according to different start-up conditions and respectively performs the block swapping operation in the first zone and the second zone, wherein the blocks in the first zone are accessed by using only the lower pages, and the blocks in the second zone are accessed by using both the lower pages and the upper pages.

According to an embodiment of the present invention, the memory management module starts the block swapping operation in the first zone when a first erased number of the first zone is greater than a first threshold, and the memory management module starts the block swapping operation in the second zone when a second erased number of the second zone is greater than a second threshold, wherein the first threshold is greater than the second threshold, and the memory management module resets the corresponding first erased number or second erased number after performing the block swapping operation.

According to an embodiment of the present invention, when the start-up condition of the block swapping operation in the first zone is met, the memory management module starts the block swapping operation in the first zone only when it determines that a write command of a host is a non-continuous command or a value gotten by subtracting the first threshold from the first erased number is greater than a predetermined upper limit, and when the start-up condition of the block swapping operation in the second zone is met, the memory management module starts the block swapping operation in the second zone only when it determines that the write command of the host is a non-continuous command or a value gotten by subtracting the second threshold from the second erased number is greater than the predetermined upper limit.

According to an embodiment of the present invention, when the start-up condition of the block swapping operation in the first zone and the start-up condition of the block swapping operation in the second zone are both met, the memory management module starts the block swapping operation only in the second zone.

According to an embodiment of the present invention, the memory management module performs the block swapping operation to move a block linked to a data area of the MLC NAND flash memory to a spare area of the MLC NAND flash memory, move a block in the spare area to the data area, and copy data in the block in the data area to the block in the spare area.

According to an embodiment of the present invention, the storage apparatus is a universal serial bus (USB) flash disk, a flash memory card, or a solid state drive (SSD).

The present invention provides a controller suitable for a MLC NAND flash memory in a storage apparatus. The MLC NAND flash memory includes a first zone and a second zone respectively having a plurality of blocks, wherein each of the blocks in the first zone and the second zone includes an upper page and a lower page. The controller includes a flash memory interface, a buffer memory, a micro-processing unit, and a memory management module. The flash memory interface is electrically connected the micro-processing unit and used for accessing the MLC NAND flash memory. The buffer memory is electrically connected the micro-processing unit and used for temporarily storing data. The memory management module is electrically connected the micro-processing unit and respectively executes a wear leveling process without resource consumption and a wear leveling process with resource consumption in the first zone and the second zone, wherein the blocks in the first zone are accessed by using only the lower pages, and the blocks in the second zone are accessed by using both the lower pages and the upper pages.

According to an embodiment of the present invention, the memory management module executes the wear leveling process without resource consumption to count a first erased number of the first zone, wherein when the first erased number is greater than a first threshold, the memory management module moves a block in the first zone which is linked to a data area of the MLC NAND flash memory to a spare area of the MLC NAND flash memory, moves a block in the first zone which is linked to the spare area to the data area, and copies data in the block in the data area to the block in the spare area.

According to an embodiment of the present invention, the memory management module executes the wear leveling process with resource consumption to count an erased number of each block in the second zone and a second erased number of the second zone, wherein when the second erased number is greater than a second threshold, the memory management module moves a block in the second zone which is linked to the data area of the MLC NAND flash memory and has a relatively small erased number to the spare area of the MLC NAND flash memory, moves a block in the second zone which is linked to the spare area and has a relatively large erased number to the data area, and copies data in the block in the data area which has the relatively small erased number to the block in the spare area which has the relatively large erased number.

According to an embodiment of the present invention, the storage apparatus is a USB flash disk, a flash memory card, or a SSD.

The present invention provides a controller suitable for a flash memory module in a storage apparatus. The flash memory module includes a first flash memory and a second flash memory. The controller includes a flash memory interface, a buffer memory, a micro-processing unit, and a memory management module. The flash memory interface is electrically connected the micro-processing unit and used for accessing the flash memory module. The buffer memory is electrically connected the micro-processing unit and used for temporarily storing data. The memory management module is electrically connected the micro-processing unit and respectively determines whether to start a block swapping operation of a wear leveling process in the first flash memory and the second flash memory of the flash memory module according to different start-up conditions and respectively performs the block swapping operation in the first flash memory and the second flash memory, wherein the first flash memory is a SLC NAND flash memory, and the second flash memory is a MLC NAND flash memory.

According to an embodiment of the present invention, the memory management module starts the block swapping operation in the first flash memory when a first erased number of the first flash memory is greater than a first threshold, and the memory management module starts the block swapping operation in the second flash memory when a second erased number of the second flash memory is greater than a second threshold, wherein the first threshold is greater than the second threshold, and the memory management module resets the first erased number and the second erased number after performing the block swapping operation.

According to an embodiment of the present invention, when the start-up condition of the block swapping operation in the first flash memory is met, the memory management module starts the block swapping operation in the first flash memory only when it determines that a write command of a host is a non-continuous command or a value gotten by subtracting the first threshold from the first erased number is greater than a predetermined upper limit, and when the start-up condition of the block swapping operation in the second flash memory is met, the memory management module starts the block swapping operation in the second flash memory only when it determines that the write command of the host is a non-continuous command or a value gotten by subtracting the second threshold from the second erased number is greater than the predetermined upper limit.

According to an embodiment of the present invention, when the start-up condition of the block swapping operation in the first flash memory and the start-up condition of the block swapping operation in the second flash memory are both met, the memory management module starts the block swapping operation only in the second flash memory.

According to an embodiment of the present invention, the storage apparatus is a USB flash disk, a flash memory card, or a SSD.

The present invention provides a controller suitable for a flash memory module in a storage apparatus. The flash memory module includes a first flash memory and a second flash memory. The controller includes a flash memory interface, a buffer memory, a micro-processing unit, and a memory management module. The flash memory interface is electrically connected the micro-processing unit and used for accessing the flash memory module. The buffer memory is electrically connected the micro-processing unit and used for temporarily storing data. The memory management module is electrically connected the micro-processing unit and respectively executes a wear leveling process without resource consumption and a wear leveling process with resource consumption in the first flash memory and the second flash memory of the flash memory module, wherein the first flash memory is a SLC NAND flash memory, and the second flash memory is a MLC NAND flash memory.

According to an embodiment of the present invention, the memory management module executes the wear leveling process without resource consumption to count a first erased number of the first flash memory, wherein when the first erased number is greater than a first threshold, the memory management module moves a block in the first flash memory which is linked to a data area of the first flash memory to a spare area of the first flash memory, moves a block in the first flash memory which is linked to the spare area to the data area, and copies data in the block in the data area to the block in the spare area.

According to an embodiment of the present invention, the memory management module executes a wear leveling process with resource consumption to count an erased number of each block in the second flash memory and a second erased number of the second flash memory, wherein when the second erased number is greater than a second threshold, the memory management module moves a block in the second flash memory which is linked to the data area of the second flash memory and has a relatively small erased number to the spare area of the second flash memory, moves a block in the second flash memory which is linked to the spare area and has a relatively large erased number to the data area, and copies data in the data area which has the relatively small erased number to the block in the spare area which has the relatively large erased number.

According to an embodiment of the present invention, the storage apparatus is a USB flash disk, a flash memory card, or a SSD.

In the wear leveling method provided by the present invention, different wear leveling rules are applied to blocks having different characteristics in a flash memory so that the lifespan of the flash memory can be effectively prolonged and at the same time, meaningless consumption of system resources can be avoided.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 is a flowchart of a wear leveling method according to another embodiment of the present invention.

DESCRIPTION OF THE EMBODIMENTS

Figure 1A:
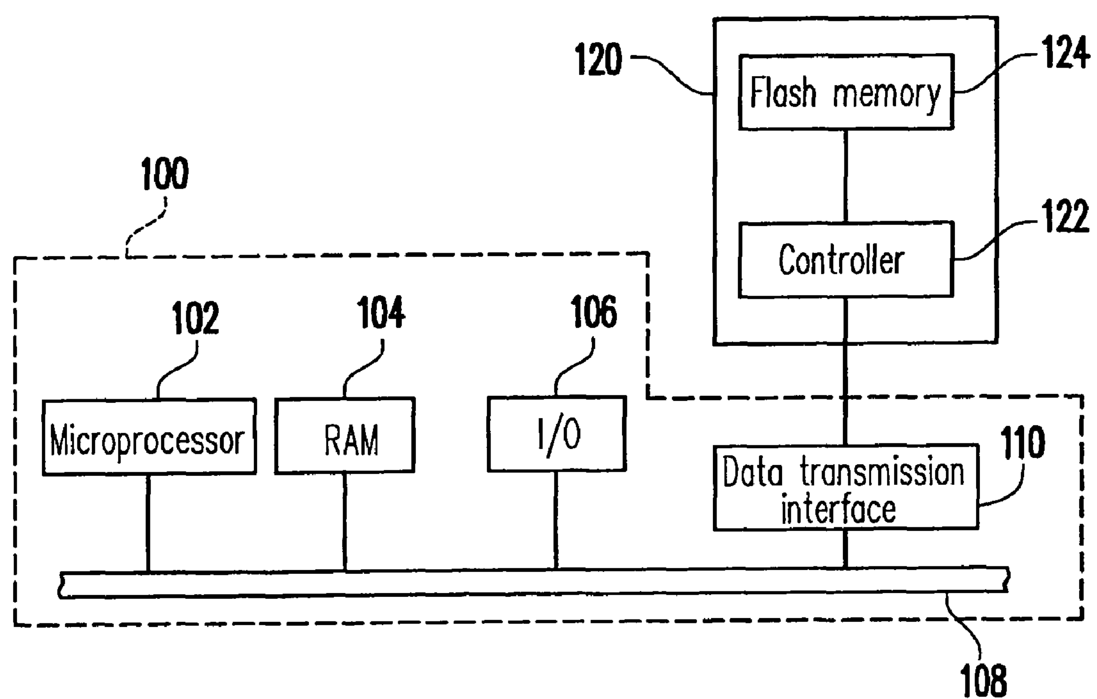
FIG. 1A illustrates a system having a flash memory storage apparatus according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In the present invention, different wear leveling processes are respectively executed to blocks in different areas of a flash memory so that meaningless consumption of system resources caused by executing the same wear levelling process to areas having different wear can be avoided.

First Embodiment

FIG. 1A illustrates a system having a flash memory storage apparatus according to the first embodiment of the present invention.

Referring to FIG. 1A, the host 100 includes a microprocessor 102, a random access memory (RAM) 104, an input/output (I/O) device 106, a system bus 108, and a data transmission interface 110. It should be understood that the host 100 may also include other components, such as a display device or a network device.

The host 100 may be a computer, a digital camera, a video camera, a communication device, an audio player, or a video player. Generally speaking, the host 100 can be substantially any system which can store data.

In the present embodiment, the flash memory storage apparatus 120 is electrically connected to the other components of the host 100 through the data transmission interface 110. Data can be written into or read from the flash memory storage apparatus 120 through the processes of the microprocessor 102, the RAM 104, and the I/O device 106. The flash memory storage apparatus 120 may be a flash disk, a flash memory card, or a solid state drive (SSD).

Figure 1B:
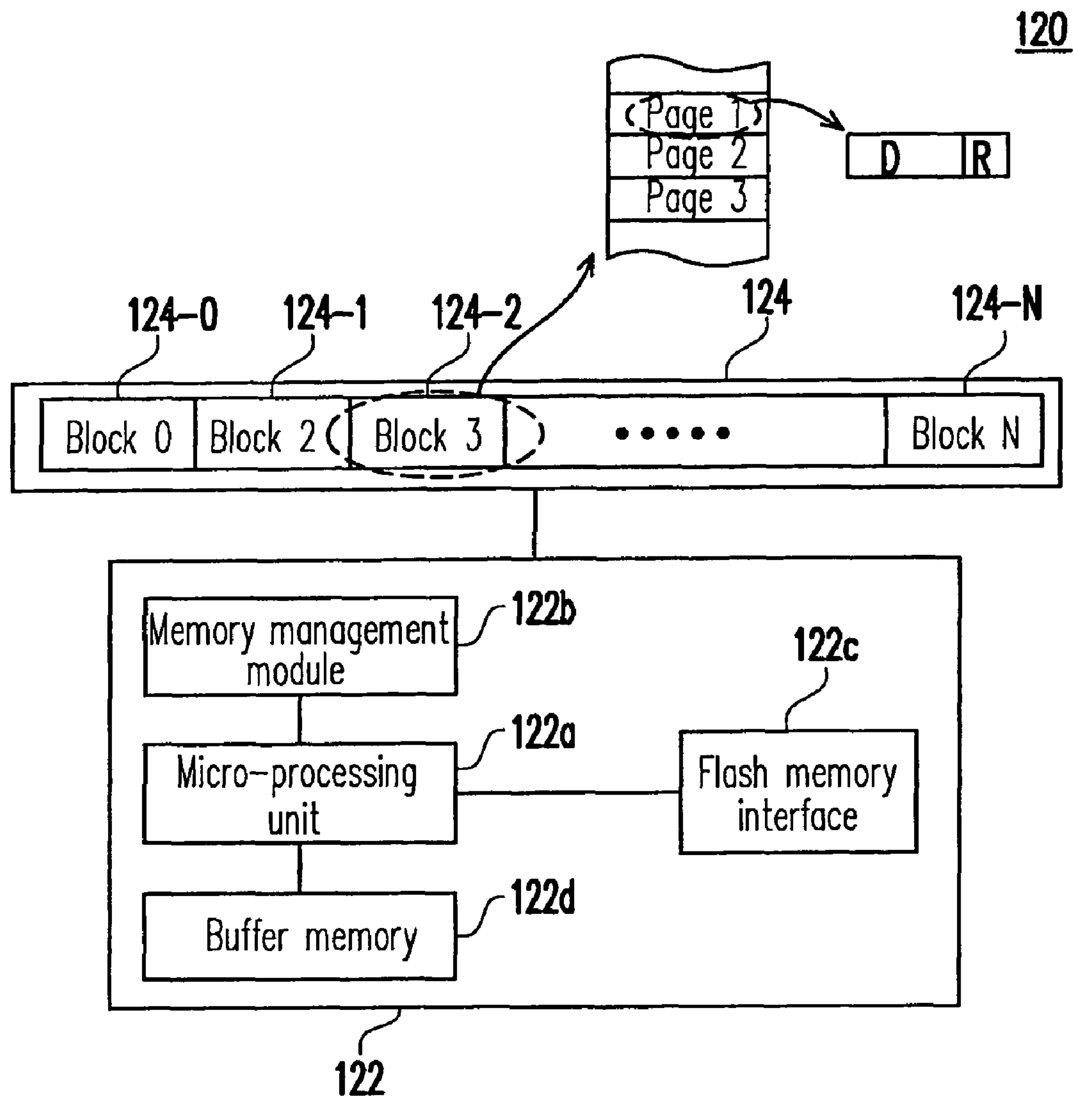
FIG. 1B is a block diagram of the flash memory storage apparatus in FIG. 1A.

FIG. 1B is a block diagram of the flash memory storage apparatus in FIG. 1A.

Referring to FIG. 1B, the flash memory storage apparatus 120 includes a controller 122 and a flash memory 124.

The controller 122 controls operations of other components in the flash memory storage apparatus 120, such as storing, reading, and erasing of data. The controller 122 includes a micro-processing unit 122*a*, a memory management module 122*b*, a flash memory interface 122*c*, and a buffer memory 122*d*.

The micro-processing unit 122*a* controls operations of other components in the controller 122.

Figure 4:
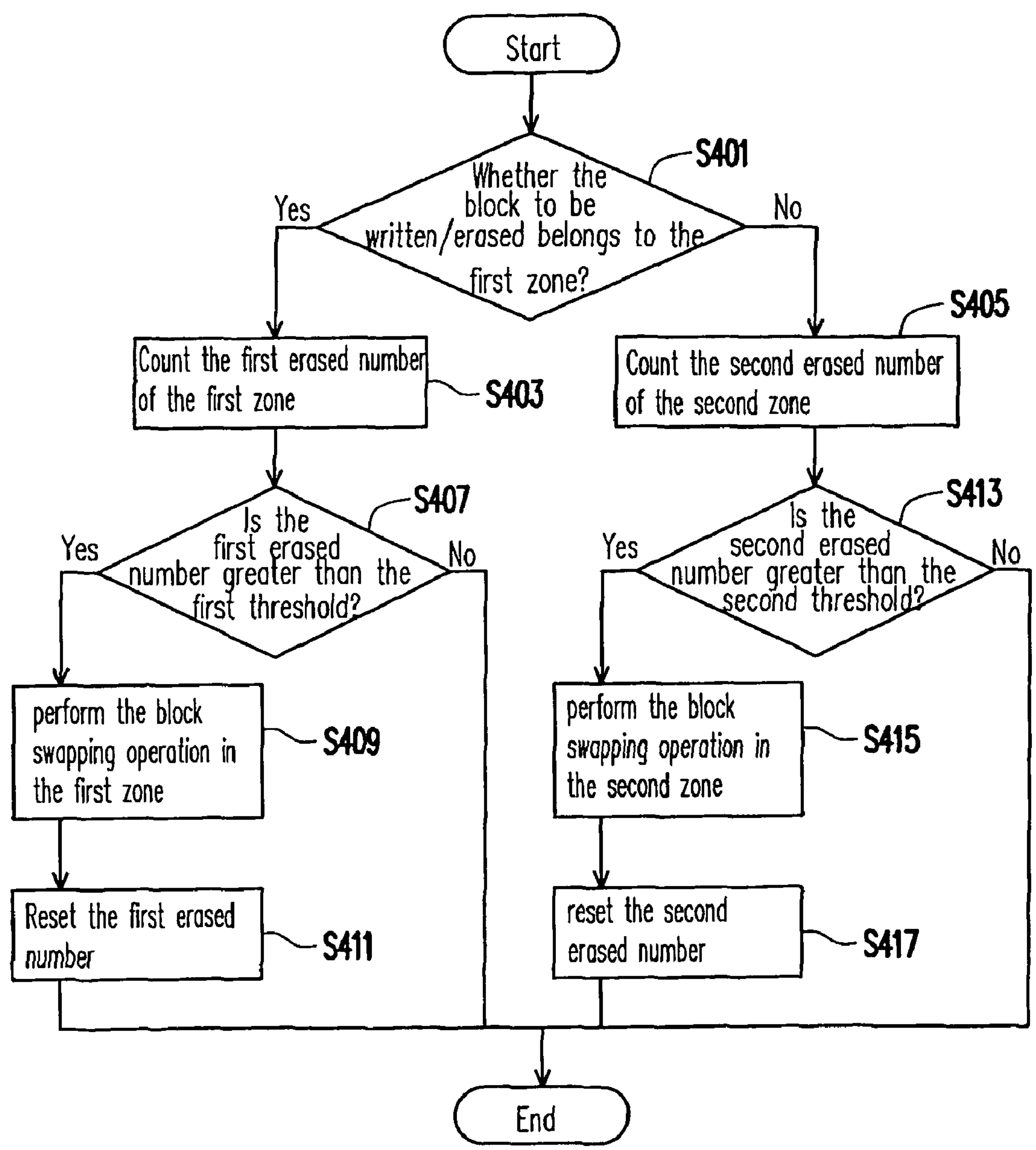
FIG. 4 is a flowchart of a wear leveling method according to the first embodiment of the present invention.

The memory management module 122*b* is electrically connected to the micro-processing unit 122*a*. The memory management module 122*b* manages the flash memory 124, for example, executes a wear levelling method, manages bad blocks, and maintains a mapping table etc. Particularly, in the present embodiment, the memory management module 122*b* executes wear levelling steps described in the present embodiment (as shown in FIG. 4).

The flash memory interface 122*c* is electrically connected to the micro-processing unit 122*a* and is used for accessing the flash memory 124. Namely, the data to be written into the flash memory 124 by the host 100 is first converted by the flash memory interface 122*c* into a format acceptable to the flash memory 124.

The buffer memory 122*d* is used for temporarily storing system data (for example, a mapping table) or the data to be read or written by the host 100. In the present embodiment, the buffer memory 122*d* is a static random access memory (SRAM). However, the present invention is not limited thereto, and a dynamic RAM (DRAM), a magnetoresistive RAM (MRAM), a phase-change RAM (PRAM), or other suitable memories may also be applied in the present invention.

Figure 1C:
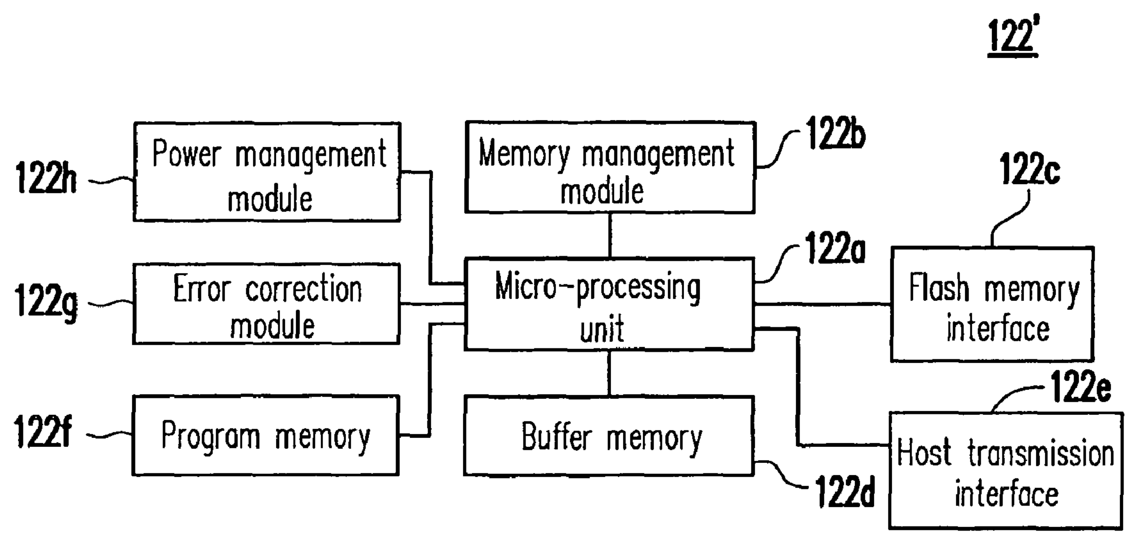
FIG. 1C is a block diagram of a controller according to another embodiment of the present invention.

In another embodiment of the present invention, the controller further includes a host transmission interface 122*e*, a program memory 122*f*, an error correction module 122*g*, and a power management module 122*h* (as the controller 122' illustrated in FIG. 1C).

The host transmission interface 122*e* is electrically connected to the micro-processing unit 122*a* and is used for communicating with the host 100. The host transmission interface 122*e* may be a USB interface, an IEEE 1394 interface, a SATA interface, a PCI Express interface, a MS interface, a MMC interface, a SD card interface, a CF card interface, or an IDE interface.

The program memory 122*f* is electrically connected to the micro-processing unit 122*a* and is used for storing a program code executed by the controller for controlling the flash memory storage apparatus 120.

The error correction module 122*g* is electrically connected to the micro-processing unit 122*a* and is used for calculating an error correcting code (ECC) to check and correct the data to be read or written by the host.

The power management module 122*h* is electrically connected to the micro-processing unit 122*a* and is used for managing the power supply of the flash memory storage apparatus 120.

The flash memory 124 is used for storing data. The flash memory 124 is usually divided into a plurality of physical blocks 124-0~124-N, and for the convenience of description, these physical blocks will be referred as blocks thereinafter. Generally speaking, a block is the smallest erasing unit in a flash memory. Namely, each block contains the least number of memory cells which are erased together. Each block is usually divided into a plurality of pages, and a page is usually the smallest programming unit. However, it should be noted that the smallest programming unit may also by a sector in some other flash memory designs. Namely, a page contains a plurality of sectors and each sector is used as the smallest programming unit. In other words, a page is the smallest unit for reading and writing data. A page usually includes a user data area D and a redundant area R. The user data area is used for storing user data, and the redundant area is used for storing system data (for example, foregoing ECC code).

Generally, the user data area D has 512 bytes and the redundant area R has 16 bytes in order to correspond to the size of sectors in a disk drive. Namely, a page is a sector. However, a page may also be composed of a plurality of sectors (for example, 4 sectors).

A block may be composed of any number of pages, such as 64 pages, 128 pages, and 256 pages etc. The blocks 124-0~124-N are usually grouped into several zones. By managing operations of a flash memory which are independent to each other to certain degree, the parallelism of the operations can be improved and the complexity for managing the operations can be reduced.

Below, the operation of a flash memory in the present invention will be described in detail with reference to accompanying drawings. It should be understood that the terms "select", "move", and "swap" used in following description are only used for describing logical operations performed to blocks in the flash memory. In other words, the physical positions of the blocks in the flash memory are not changed and the operations are only performed to the blocks logically.

Figure 2:
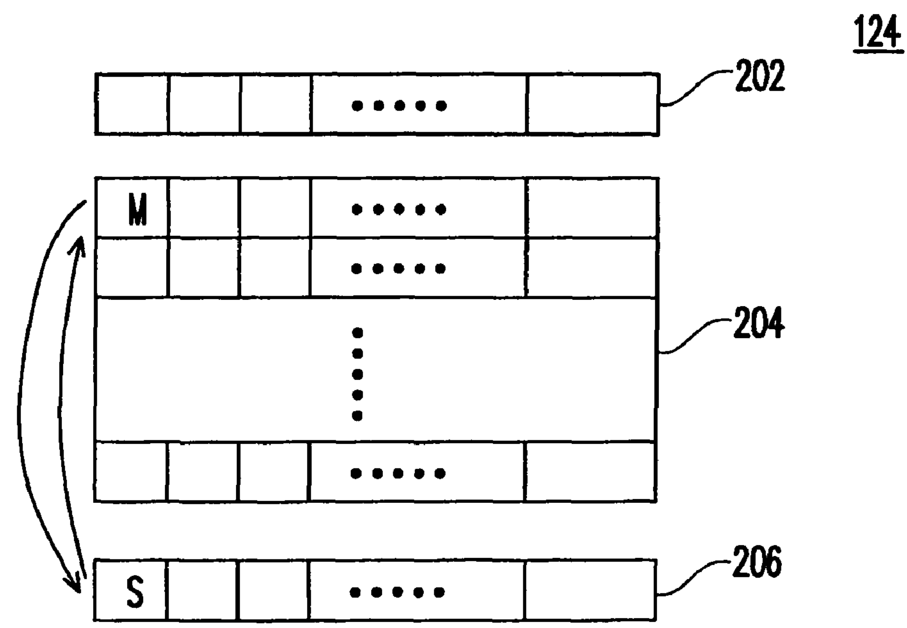
FIG. 2 is a block diagram illustrating a flash memory and the operation thereof according to the first embodiment of the present invention.

FIG. 2 is a block diagram illustrating the flash memory 124 and the operation thereof according to the first embodiment of the present invention.

Referring to FIG. 2, in the present embodiment, the blocks 124-1~124-N in the flash memory 124 are logically grouped into a system area 202, a data area 204, and a spare area 206 in order to program (i.e. write or erase) the flash memory 124 efficiently. Generally speaking, more than 90% of the blocks in the flash memory 124 belong to the data area 204.

Blocks in the system area 202 are used for recording system data, such as the number of zones in the flash memory

124, the number of blocks in each zone, the number of pages in each block, and a logical-physical mapping table etc.

Blocks in the data area 204 are used for storing user data. Generally speaking, these blocks are corresponding to the logical block addresses (LBAs) operated by the host 100.

Blocks in the spare area 206 are used for replacing blocks in the data area 204. Accordingly, the blocks in the spare area 206 are empty or available blocks, namely, no data is recorded in these blocks or data recorded in these blocks has been marked as invalid data. To be specific, an erasing operation has to be performed before writing data into a position in which data has been recorded. However, as described above, data is written into a flash memory in unit of pages while erased from the same in unit of blocks. Since an erase unit is larger than a write unit, those valid pages in a block have to be copied to another block before erasing data from the block. Accordingly, to write a new data into a block M in the data area 204 in which a data has been recorded, a block S is first selected from the spare area 206, and the valid data in the block M is copied to the block S and the new data is also written into the block S. After that, the block M is erased and moved to the spare area 206, and the block S is moved to the data area 204. It has to be understood that moving the block M to the spare area 206 and at the same time moving the block S to the data area 204 means that the block M is logically linked to the spare area 206 and the block S is logically linked to the data area 204. It should be understood by those having ordinary knowledge in the art that the logical relationship between blocks in the data area 204 can be maintained through a logical-physical mapping table.

Generally speaking, those blocks frequently swapped between the data area 204 and the spare area 206 are referred as dynamic data blocks. Besides, some data may not be updated once it is written into the data area 204. For example, 100 MP3 songs are written into the data area 204 as the favorite songs of a user therefore are not changed ever. The blocks for storing such data are referred as static data blocks. The erased numbers of static data blocks are relatively low since data in static data blocks are seldom updated. Thus, in the present embodiment, the memory management module 122*a* of the controller 122 executes a wear leveling method to effectively level the wear of the blocks 124-1~124-N.

Figure 3A:
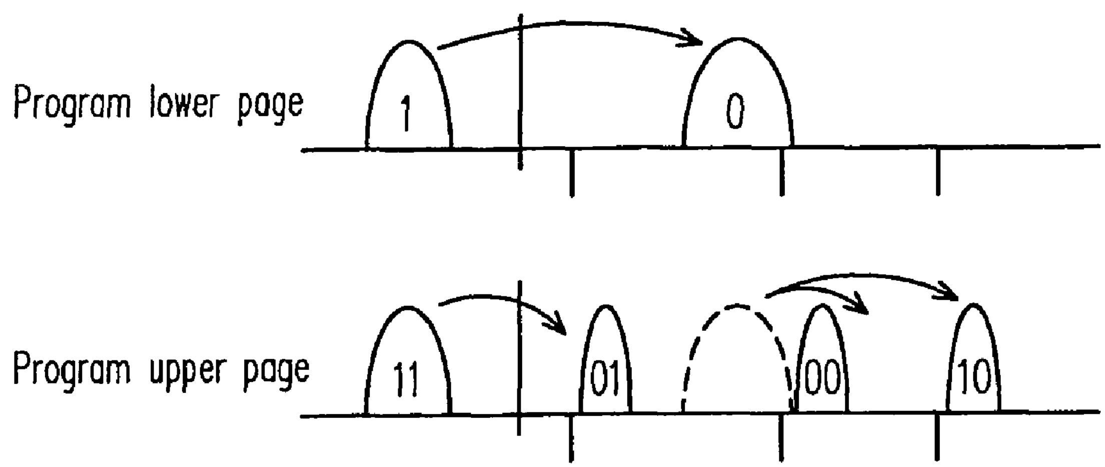
FIG. 3A illustrates the two phases for programming a MLC NAND flash memory.
Figure 3B:
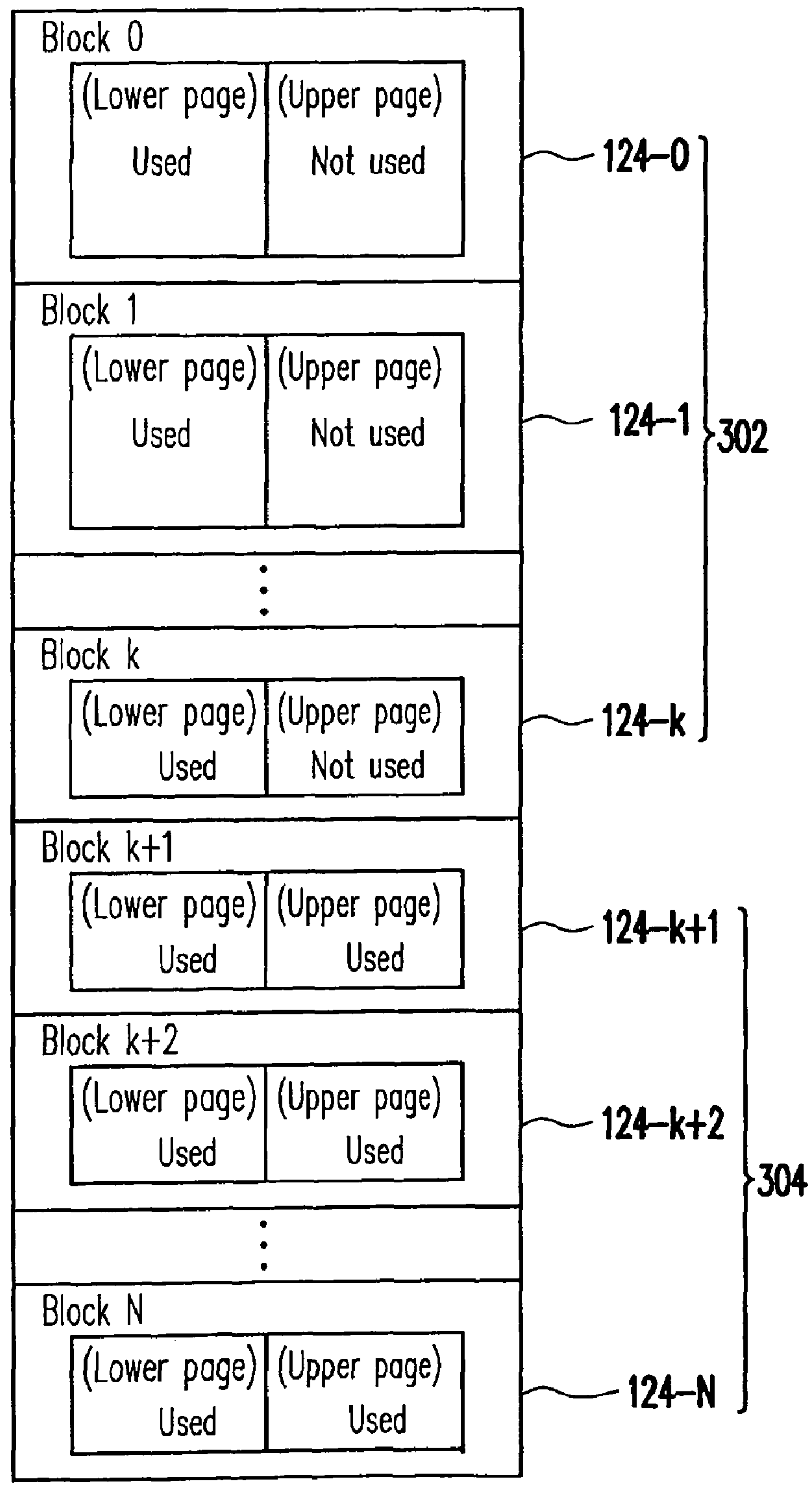
FIG. 3B illustrates how to group blocks in a MLC NAND flash memory into different zones according to the first embodiment of the present invention.

It should be mentioned that in the present embodiment, the flash memory 124 is a multi level cell (MLC) NAND flash memory, and the programming of blocks in the MLC NAND flash memory can be divided into multiple phases. Taking a 4-level cell NAND flash memory as an example, as shown in FIG. 3A, the programming of blocks in this flash memory can be divided into two phases. During the first phase, the lower pages are written, and the physical characteristics thereof are similar to those of a single level cell (SLC) NAND flash memory. The upper pages are programmed after the first phase is completed. The writing speed of the lower pages is faster than that of the upper pages. In particular, the upper pages and the lower pages have certain coupling relationship. In other words, instability of the lower pages may be caused (i.e. data may be lost) if an error occurs while programming the upper pages. This is the why the reliability of MLC NAND flash memories is lower than that of SLC NAND flash memories. Similarly, in an 8-level cell NAND flash memory or a 16-level cell NAND flash memory, a memory cell includes more pages and accordingly the blocks are programmed in more phases. Here, those pages having the fastest writing speed are referred as lower pages, and the other pages which have slower writing speeds are referred as upper pages. For example, the upper pages include a plurality of pages having different writing speeds. Referring to FIG. 3B, in the present embodiment, the blocks in the flash memory 124 are logically grouped into a first zone 302 and a second zone 304, wherein blocks 124-0~124-*k* in the first zone 302 are accessed by using only the lower pages, and blocks 124-(*k*+1)~124-N in the second zone 304 are accessed by using the lower pages and the upper pages. For example, the first zone 302 is used for storing more important data (for example, firmware code) since the access thereof is more stable, and the second zone 304 is used for storing general data. In addition, it should be mentioned here that the first zone and the second zone may also be both or respectively specific SLC or MLC blocks. For example, the first zone is a SLC block, and the second zone is a MLC block.

Based on the characteristics of the flash memory 124 in the present embodiment, the wear levelling method executed by the memory management module 122*a* is started in different areas of the flash memory 124 according to different rules.

FIG. 4 is a flowchart of a wear leveling method according to the first embodiment of the present invention.

Referring to FIG. 4, during the operation of the flash memory storage apparatus 120, the controller 122 respectively determines whether to start a block swapping operation of a wear leveling process in the first zone 302 and the second zone 304 of the flash memory 124 according to different start-up conditions, and when the start-up conditions are met, the controller 122 respectively performs the block swapping operation in the first zone 302 and the second zone 304. The block swapping operation is that moving a block linked to the data area 204 of the flash memory 124 to the spare area 206 of the flash memory 124 and moving a block linked to the spare area 206 to the data area 204 while copying the data stored in the block in the data area 204 to the block in the spare area 206 and erasing the block in the data area 204. That is, a block belonging to the spare area 206 may record the data originally stored in a block belonging to the data area 204 and the block belonging to the data area 204 is erased, and then the block belonging to the spare area 206 is moved to belong to the data area 204 and the block belonging to the data area 204 is moved to belong the spare area 206.

To be specific, the controller 122 starts the wear levelling method in the present embodiment whenever it executes a write/erase command to the flash memory 124. First, in step S401, whether the block to be written/erased belongs to the first zone 302 (i.e. a block which is accessed by using only the lower page) is determined. If it is determined in step S401 that the block to be written/erased is in the first zone 302, a first erased number of the first zone 302 is increased (for example, by 1) as in step S403. If it is determined in step S401 that the block to be written/erased is not in the first zone 302, namely, the block is in the second zone 304, a second erased number of the second zone 304 is increased (for example, by 1) as in step S405.

In step S407, whether the first erased number is greater than a first threshold is determined, wherein the first threshold is a value preset by a user. In the present embodiment, the first threshold is set to 1000. If it is determined in step S407 that the first erased number is greater than the first threshold, the block swapping operation is performed in the first zone 302 (step S409), and then the first erased number is reset (step S411).

In step S413, whether the second erased number is greater than a second threshold is determined, wherein the second threshold is a value preset by the user. In the present embodiment, the second threshold is set to 100. If it is determined in step S413 that the second erased number is greater than the second threshold, the block swapping operation is performed in the second zone 304 (step S415), and then the second erased number is reset (step S417).

In particular, the first threshold is set to be greater than the second threshold. This is because the blocks which are accessed by using only the lower pages (i.e. the first zone 302) have longer lifespan, and accordingly the block swapping operation can be performed in longer intervals. However, those blocks which are accessed by using both lower pages and upper pages (i.e. the first zone 302) have shorter lifespan and accordingly the block swapping operation has to be performed in shorter intervals. In the present embodiment, the block swapping operation is performed in different frequencies in different areas (i.e. the first zone 302 and the second zone 304) so that wear of the blocks can be effectively leveled and meaningless resource consumption of the controller 122 caused by executing the wear leveling process too frequently can be avoided.

There may be other conditions for determining whether to start the block swapping operation in another embodiment of the present invention. FIG. 5 is a flowchart of a wear levelling method according to another embodiment of the present invention. For example, when the start-up condition of the block swapping operation in the first zone 302 is met, the block swapping operation is performed in the first zone 302 only when it is determined that the write command of the host 100 is a non-continuous command or a value gotten by subtracting the first threshold from the first erased number is greater than a predetermined upper limit (step S501 in FIG. 5). In other words, when the first erased number is greater than the first threshold (for example, 1000), the block swapping operation is performed only when it is determined that the current writing operation is a non-continuous writing operation or the current writing operation is a continuous writing operation but the first erased number has exceeded the sum (e.g. 1100) of the first threshold (e.g. 1000) and the predetermined upper limit (e.g. 100). Similarly, when the start-up condition of the block swapping operation in the second zone 304 is met, the block swapping operation in the second zone 304 is performed only when it is determined that the write command of the host 100 is a non-continuous command or a value gotten by subtracting the second threshold from the second erased number is greater than the predetermined upper limit (as step S503 in FIG. 5).

In another embodiment of the present invention, the wear leveling method further includes performing the block swapping operation in only the second zone 304 during the current writing/erasing operation and then performing the block swapping operation in the first zone 302 during the next writing/erasing operation when the start-up conditions of the block swapping operation in the first zone 302 and the second zone 304 are both met. By doing this, the long delay time caused by performing the block swapping operation in both the first zone 302 and the second zone 304 during a single writing/erasing operation can be avoided.

By further determining that the write command of the host 100 is a non-continuous command, the delay of writing time caused by performing the block swapping operation when the host 100 performs a continuous writing operation (for example, it is considered a continuous writing operation when the number of data to be written is greater than 1; however, the number is not limited only to 1 in the present invention) can be avoided. By setting the predetermined upper limit, the situation that the block swapping operation is not performed for a long time when the host 100 keeps executing continuous write commands can be avoided. In addition, when the start-up conditions of the block swapping operation in the first zone 302 and the second zone 304 are both met, the block swapping operation is only performed in the second zone 304 first so that the delay of writing time caused by performing the block swapping operation in the two zones at the same time can be avoided.

Additionally, in the present embodiment, the block swapping operation of the wear leveling process is to select blocks to be swapped in the data area and the spare area randomly. However, in another embodiment of the present invention, other suitable methods for swapping blocks in the data area and the spare area may also be adopted. For example, a block in the data area which has a relatively small erased number is swapped with a block in the spare area which has a relatively large erased number, wherein the relatively small erased number means that the erased number of the block is lower than the average erased number of all the blocks, and the relatively large erased number means that the erased number of the block is higher than the averaged erased number of all the blocks.

It should be mentioned that in the present embodiment, different wear leveling processes are executed in different areas of a flash memory by starting the block swapping operation in these areas in different frequencies, wherein the different areas are grouped into a first zone and a second zone according to whether the blocks therein are accessed by using only the lower pages or both the lower pages and the upper pages. However, the present invention may also be applied to a flash memory module having a plurality of flash memories, wherein different wear leveling processes are executed to different flash memories in the flash memory module by starting the block swapping operation in these flash memories in different frequencies.

Figure 6:
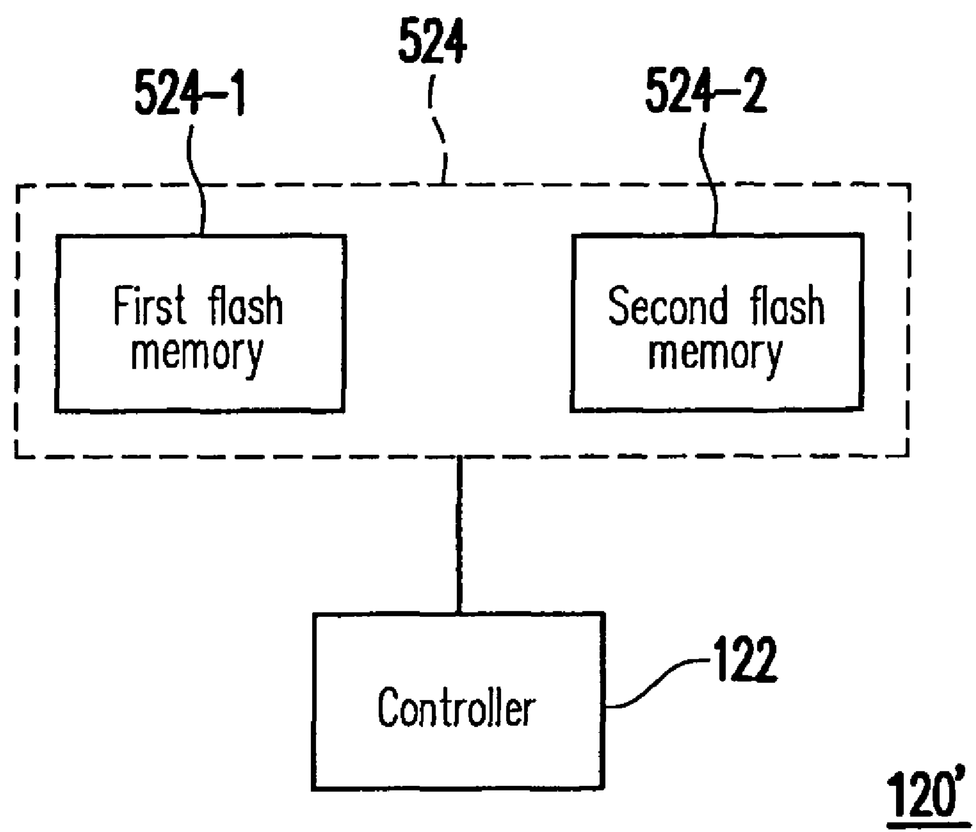
FIG. 6 is a block diagram of a flash memory storage apparatus according to another embodiment of the present invention.

As shown in FIG. 6, the flash memory storage apparatus 120' includes a controller 122 and a flash memory module 524. The flash memory module 524 includes a first flash memory 524-1 and a second flash memory 524-2, wherein the first flash memory 524-1 is a SLC NAND flash memory, and the second flash memory 524-2 is a MLC NAND flash memory, and the first flash memory 524-1 and the second flash memory 524-2 also perform the operation as shown in FIG. 2. In particular, the programming of the first flash memory 524-1 is similar to that of the first zone 302 (i.e. is accessed by using only the lower pages), and the programming of the second flash memory 524-2 is similar to that of the second zone 304 (i.e. is accessed by using both the lower pages and the upper pages). Accordingly, compared to that in the second flash memory 524-2, data access in the first flash memory 524-1 is more stable and faster, and besides, the lifespan of the first flash memory 524-1 is longer than that of the second flash memory 524-2. Thus, the wear levelling method in the present embodiment may also be applied to the flash memory module 524 so as to execute different wear leveling processes to different flash memories in the flash memory module by starting the block swapping operation in different frequencies in these flash memories. Thereby, meaningless consumption of system resources of the controller 122 can be avoided.

Second Embodiment

In the first embodiment, different wear leveling processes are executed in different areas of a flash memory by starting the block swapping operation in there areas in different frequencies. However, in the present embodiment, totally different wear leveling processes are executed in different areas of a flash memory.

The hardware structure and the operation of the flash memory in the present embodiment are the same as those in the first embodiment (as shown in FIGS. 1A~1B, 2, and 3A~3B) therefore will not be described herein. The difference between the two embodiments is that in the wear levelling method of the second embodiment, two different wear leveling processes are executed to level the wear of the first zone 302 and the second zone 304 in the flash memory 124.

Figure 7:
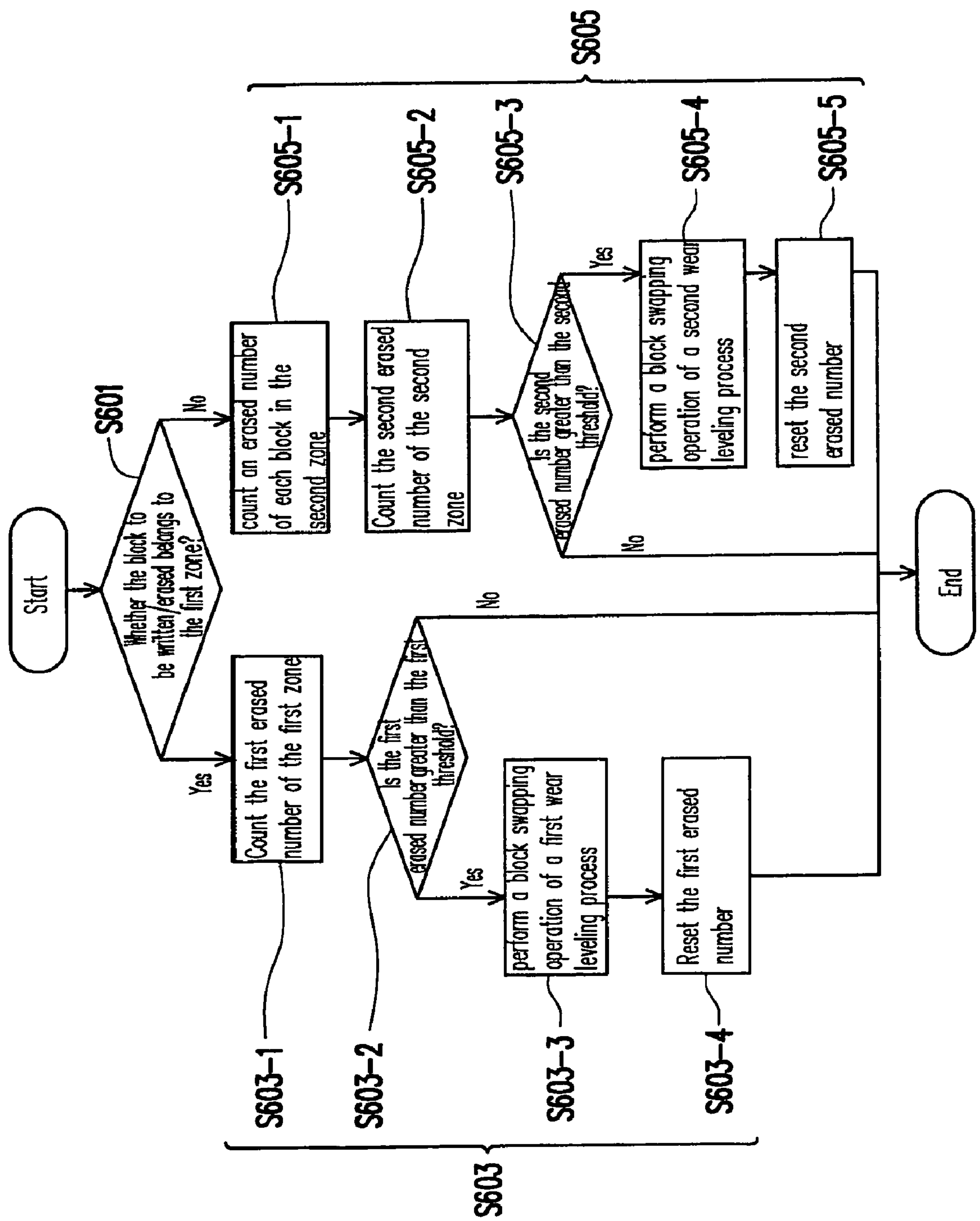
FIG. 7 is a flowchart of a wear leveling method according to a second embodiment of the present invention.

FIG. 7 is a flowchart of a wear leveling method according to the second embodiment of the present invention.

Referring to FIG. 7, during the operation of the flash memory storage apparatus 120, the controller 122 respectively executes a first wear leveling process and a second wear leveling process in the first zone 302 and the second zone 304, wherein the second wear leveling process consumes more resources of the controller 122 than the first wear leveling process.

To be specific, the controller 122 starts the wear leveling method described in the present embodiment whenever it executes a writing/erasing command to a block in the flash memory 124. First, in step S601, whether the block to be written/erased belongs to the first zone 302 (i.e. a block which is accessed by using only the lower page) is determined. If it is determined in step S601 that the block to be written/erased is in the first zone 302, the first wear leveling process is executed, as in step S603. If it is determined in step S601 that the block to be written/erased is not in the first zone 302 (i.e., the block is in the second zone 304), the second wear leveling process is executed, as in step S605.

The first wear leveling process includes counting a first erased number of the first zone 302 (for example, increasing the first erased number by 1) in step S603-1. After that, whether the first erased number is greater than a first threshold is determined in step S603-2, wherein the first threshold is preset by a user. If it s determined in step S603-2 that the first erased number is greater than the first threshold, a block swapping operation of the first wear leveling process is performed, as in step S603-3. Namely, a random block in the first zone 302 which is linked to the data area 204 of the flash memory 124 is moved to the spare area 206 of the flash memory 124, and a block in the first zone 302 which is linked to the spare area 206 is moved to the data area 204, while data in the block in the data area 204 is copied to the block in the spare area 206, and the block in the data area 204 is then erased. After that, in step S603-4, the first erased number is reset.

In the second wear leveling process, first an erased number of each block in the second zone is counted in step S605-1. Next, in step S605-2, a second erased number of the second zone is counted (for example, by increasing the second erased number by 1). After that, in step S605-3, whether the second erased number is greater than a second threshold is determined, wherein the second threshold is preset by the user. If it is determined in step S605-3 that the second erased number is greater than the second threshold, the block swapping operation of the second wear leveling process is performed, as in step S605-4. To be specific, a block in the second zone 304 which is linked to the data area 204 of the flash memory 124 and has a relatively small erased number is moved to the spare area 206 of the flash memory 124, a block in the second zone 304 which is linked to the spare area 206 and has a relatively large erased number is moved to the data area 204, while data in the block in the data area 204 which has the relatively small erased number is copied to the block in the spare area 206 which has the relatively large erased number, and the block in the data area 204 is then erased. The relatively small erased number means that the erased number of the block is smaller than the average erased number of all the blocks, and the relatively large erased number means that the erased number of the block is larger than the average erased number of all the blocks. After that, in step S605-5, the second erased number is reset. In the second wear leveling process, since the block to be swapped is selected according to the erased number thereof, the erased number of each block has to be recorded, and accordingly the second wear leveling process consumes more resources of the controller 122 than the first wear leveling process. However, since the block to be swapped is selected based on the erased number thereof in the second wear leveling process, the performance thereof in wear levelling is better (or more accurate) than the first wear levelling process.

In particular, since those blocks which are accessed by using only the lower pages (i.e. the first zone 302) have longer lifespan, a simpler wear leveling process which consumes less controller resources can be executed to level the wear of the blocks. However, since those blocks which are accessed by using both the lower pages and the upper pages (i.e. the first zone 302) have shorter lifespan, a wear leveling process which is more accurate and consumes more controller resources has to be executed to level the wear of the blocks. In the present embodiment, different wear leveling processes are executed in different areas (i.e. the first zone 302 and the second zone 304) for levelling the wear of the blocks. Thereby, meaningless system resource consumption of the controller 122 can be avoided.

Additionally, in the present embodiment, other conditions may be further considered to determine whether to perform the block swapping operation besides using the first threshold and the second threshold. For example, when the start-up condition of the block swapping operation in the first zone 302 is met, the block swapping operation is performed in the first zone 302 only when it is determined that a write command of the host 100 is a non-continuous command or a value gotten by subtracting the first threshold from the first erased number is greater than a predetermined upper limit and the start-up condition of the block swapping operation in the second zone 304 is not met. For example, when the start-up condition of the block swapping operation in the second zone 304 is met, the block swapping operation is performed in the second zone 304 only when it is determined that the write command of the host 100 is a non-continuous command or a value gotten by subtracting the second threshold from the second erased number is greater than the predetermined upper limit. The reason for determining whether to perform the block swapping operation by using foregoing conditions is the same as that described in the first embodiment therefore will not be described herein.

It should be understood that the present invention is not limited to foregoing example of the first wear leveling process and the second wear leveling process; instead, other wear leveling processes may also be used without departing the scope and spirit of the present invention.

It should be mentioned that the wear leveling method in the present embodiment may also be applied to the flash memory storage apparatus 120' as shown in FIG. 6. To be specific, in another embodiment of the present invention, the first wear leveling process is executed in the first flash memory 524-1 of the flash memory module 524 and the second wear leveling process is executed in the second flash memory 524-2 of the flash memory module 524. Moreover, the wear leveling method could be implemented by firmware, hardware, software or selected from the group consisting of firmware, hardware, software.

In overview, according to the present invention, different wear leveling rules are adopted for blocks having different program characteristics in a flash memory or a flash memory module so that wear of the blocks can be effectively leveled and at the same time, meaningless consumption of system resources caused by executing wear leveling processes too often can be avoided. Moreover, in the present embodiment, delay of writing operation is further prevented by using the characteristics of a write command (i.e., whether it is a continuous or a non-continuous command) besides using the erased numbers as the start-up conditions for performing the block swapping operation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wear leveling method, for a multi level cell (MLC) NAND flash memory, wherein the MLC NAND flash memory comprises a first zone having a plurality of blocks and a second zone having a plurality of blocks, and each of the blocks in the first zone and the second zone comprises an upper page and a lower page, the wear leveling method comprising:

determining whether to start a block swapping operation of a wear leveling process in the first zone of the MLC NAND flash memory according to a first start-up condition;

determining whether to start the block swapping operation in the second zone of the MLC NAND flash memory according to a second start-up condition, wherein the first start-up condition is different from the second start-up condition;

when the first start-up condition is met, performing the block swapping operation in the first zone; and when the second start-up condition is met, performing the block swapping operation in the second zone, wherein the blocks in the first zone are accessed by using only the lower pages, and the blocks in the second zone are accessed by using both the lower pages and the upper pages.

2. The wear leveling method according to claim 1, wherein the first start-up condition is that a first erased number of the first zone is greater than a first threshold, and the second start-up condition is that a second erased number of the second zone is greater than a second threshold, wherein the first threshold is greater than the second threshold, and the corresponding first erased number or second erased number is reset after the block swapping operation is performed.

3. The wear leveling method according to claim 2, wherein when the first start-up condition is met, the block swapping operation is started in the first zone only when it is determined that a write command of a host is a non-continuous write command or a value gotten by subtracting the first threshold from the first erased number is greater than a predetermined upper limit; and wherein when the second start-up condition is met, the block swapping operation is started in the second zone only when it is determined that the write command of the host is a non-continuous write command or a value gotten by subtracting the second threshold from the second erased number is greater than the predetermined upper limit.

4. The wear leveling method according to claim 3, wherein when the first start-up condition and the second start-up condition are both met, the block swapping operation is started earlier in the second zone than the block swapping operation is done in the first zone.

5. The wear leveling method according to claim 3, wherein the block swapping operation is to move a block linked to a data area of the MLC NAND flash memory to a spare area of the MLC NAND flash memory, move a block linked to the spare area to the data area, and copy data in the block in the data area to the block in the spare area.

6. A wear leveling method, for a MLC NAND flash memory, wherein the MLC NAND flash memory comprises a first zone having a plurality of blocks and a second zone having a plurality of blocks, and each of the blocks in the first zone and the second zone comprises an upper page and a lower page, the wear leveling method comprising:

respectively performing a first wear leveling process and a second wear leveling process in the first zone and the second zone, wherein the first wear leveling process is different from the second wear leveling process, wherein the blocks in the first zone are accessed by using only the lower pages, and the blocks in the second zone are accessed by using both the lower pages and the upper pages.

7. The wear leveling method according to claim 6, wherein the first wear leveling process comprises:

counting a first erased number of the first zone; and moving a block in the first zone which is linked to a data area of the MLC NAND flash memory to a spare area of the MLC NAND flash memory, moving a block in the first zone which is linked to the spare area to the data area, and copying data in the block in the data area to the block in the spare area when the first erased number is greater than a first threshold.

8. The wear leveling method according to claim 6, wherein the second wear leveling process comprises:

counting an erased number of each of the blocks in the second zone;

counting a second erased number of the second zone; and moving a block in the second zone which is linked to a data area of the MLC NAND flash memory and has a relatively small erased number to a spare area of the MLC NAND flash memory, moving the block in the second zone which is linked to the spare area and has a relatively large erased number to the data area, and copying data in the block in the data area which has the relatively small erased number to the block in the spare area which has the relatively large erased number when the second erased number is greater than a second threshold.

9. A wear levelling method, for a flash memory module having a first flash memory and a second flash memory, the wear levelling method comprising:

determining whether to start a block swapping operation of a wear leveling process in the first flash memory according to a first start-up condition;

determining whether to start the block swapping operation in the second flash memory according to a second start-up condition, wherein the first start-up condition is different from the second start-up condition;

when the first start-up condition is met, performing the block swapping operation in the first flash memory; and when the second start-up condition is met, performing the block swapping operation in the second flash memory, wherein the first flash memory is a single level cell (SLC) NAND flash memory, and the second flash memory is a MLC NAND flash memory.

10. The wear leveling method according to claim 9, wherein the first start-up condition is that a first erased number of the first flash memory is greater than a first threshold, and the second start-up condition is that a second erased number of the second flash memory is greater than a second threshold, wherein the first threshold is greater than the second threshold, and the corresponding first erased number or second erased number is reset after the block swapping operation is performed.

11. The wear leveling method according to claim 10, wherein when the first start-up condition is met, the block swapping operation is started in the first flash memory only when it is determined that a write command of a host is a non-continuous command or a value gotten by subtracting the first threshold from the first erased number is greater than a predetermined upper limit; and when the second start-up condition is met, the block swapping operation is started in the second flash memory only when it is determined that the write command of the host is a non-continuous command or a value gotten by subtracting the second threshold from the second erased number is greater than the predetermined upper limit.

12. The wear leveling method according to claim 11, wherein when the first start-up condition and the second start-up condition are both met, the block swapping operation is started earlier in the second flash memory than the block swapping operation is done in the first flash memory.

13. The wear leveling method according to claim 11, wherein the block swapping operation is to move a block linked to a data area of the flash memory module to a spare area of the flash memory module, move a block linked to the spare area to the data area, and copy data in the block in the data area to the block in the spare area.

14. A wear levelling method, for a flash memory module having a first flash memory and a second flash memory, the wear levelling method comprising:

respectively executing a first wear leveling process and a second wear leveling process in the first flash memory and the second flash memory of the flash memory module, wherein the first wear leveling process is different from the second wear leveling process, wherein the first flash memory is a SLC NAND flash memory, and the second flash memory is a MLC NAND flash memory.

15. The wear leveling method according to claim 14, wherein the first wear leveling process comprises:

counting a first erased number of the first flash memory; and moving a block in the first flash memory which is linked to a data area of the first flash memory to a spare area of the first flash memory, moving a block in the first flash memory which is linked to the spare area to the data area, and copying data in the block in the data area to the block in the spare area when the first erased number is greater than a first threshold.

16. The wear leveling method according to claim 14, wherein the second wear leveling process comprises:

counting an erased number of each of the blocks in the second flash memory;

counting a second erased number of the second flash memory; and moving a block in the second flash memory which is linked to a data area of the second flash memory and has a relatively small erased number to a spare area of the second flash memory, moving a block in the second flash memory which is linked to the spare area and has a relatively large erased number to the data area, and copying data in the block in the data area which has the relatively small erased number to the block in the spare area which has the relatively large erased number when the second erased number is greater than a second threshold.

17. A controller, for a MLC NAND flash memory in a storage apparatus, wherein the MLC NAND flash memory comprises a first zone having a plurality of blocks and a second zone having a plurality of blocks, and each of the blocks in the first zone and the second zone comprises an upper page and a lower page, the controller comprising:

a micro-processing unit;

a flash memory interface, electrically connected the micro-processing unit for accessing the MLC NAND flash memory;

a buffer memory, electrically connected the micro-processing unit for temporarily storing data; and a memory management module, electrically connected the micro-processing unit for determining whether to start a block swapping operation of a wear leveling process in the first zone of the MLC NAND flash memory according to a first start-up condition and determining whether to start the block swapping operation in the second zone of the MLC NAND flash memory according to a second start-up condition, wherein the first start-up condition is different from the second start-up condition, wherein when the first start-up condition is met, the memory management module performs the block swapping operation in the first zone, wherein when the second start-up condition is met, memory management module performs the block swapping operation in the second zone, wherein the blocks in the first zone are accessed by using only the lower pages, and the blocks in the second zone are accessed by using both the lower pages and the upper pages.

18. The controller according to claim 17, wherein the first start-up condition is that a first erased number of the first zone is greater than a first threshold, and the second start-up condition is that a second erased number of the second zone is greater than a second threshold, wherein the first threshold is greater than the second threshold, and the corresponding first erased number or second erased number is reset after the block swapping operation is performed.

19. The controller according to claim 18, wherein when the first start-up condition is met, the memory management module starts the block swapping operation in the first zone only when the memory management module determines that a write command of a host is a non-continuous command or a value gotten by subtracting the first threshold from the first erased number is greater than a predetermined upper limit and the start-up condition of the block swapping operation in the second zone is not met; and wherein when the second start-up condition is met, the memory management module starts the block swapping operation in the second zone only when the memory management module determines that the write command of the host is a non-continuous command or a value gotten by subtracting the second threshold from the second erased number is greater than the predetermined upper limit.

20. The controller according to claim 19, wherein when the first start-up condition and the second start-up condition are both met, the memory management module starts the block swapping operation earlier in the second zone than the memory management module starts the block swapping operation in the first zone.

21. The controller according to claim 19, wherein the memory management module performs the block swapping operation to move a block linked to a data area of the MLC NAND flash memory to a spare area of the MLC NAND flash memory, move a block in the spare area to the data area, and copy data in the block in the data area to the block in the spare area.

22. The controller according to claim 17, wherein the storage apparatus is a universal serial bus (USB) flash disk, a flash memory card, or a solid state drive (SSD).

23. A controller, for a MLC NAND flash memory in a storage apparatus, wherein the MLC NAND flash memory comprises a first zone having a plurality of blocks and a second zone having a plurality of blocks, and each of the blocks in the first zone and the second zone comprises an upper page and a lower page, the controller comprising:

a micro-processing unit;

a flash memory interface, electrically connected the micro-processing unit for accessing the MLC NAND flash memory;

a buffer memory, electrically connected the micro-processing unit for temporarily storing data; and a memory management module, electrically connected the micro-processing unit for respectively executing a first wear leveling process and a second wear leveling process in the first zone and the second zone, wherein the first wear leveling process is different from the second wear leveling process, wherein the blocks in the first zone are accessed by using only the lower pages, and the blocks in the second zone are accessed by using both the lower pages and the upper pages.

24. The controller according to claim 23, wherein the memory management module executes the first wear leveling process to count a first erased number of the first zone, wherein when the first erased number is greater than a first threshold, a block in the first zone which is linked to a data area of the MLC NAND flash memory is moved to a spare area of the MLC NAND flash memory, a block in the first zone which is linked to the spare area is moved to the data area, and data in the block in the data area is copied to the block in the spare area.

25. The controller according to claim 23, wherein the memory management module executes the second wear leveling process to count an erased number of each of the blocks in the second zone and a second erased number of the second zone, wherein when the second erased number is greater than a second threshold, a block in the second zone which is linked to the data area of the MLC NAND flash memory and has a relatively small erased number is moved to the spare area of the MLC NAND flash memory, a block in the second zone which is linked to the spare area and has a relatively large erased number is moved to the data area, and data in the block in the data area which has the relatively small erased number is copied to the block in the spare area which has the relatively large erased number.

26. The controller according to claim 23, wherein the storage apparatus is a USB flash disk, a flash memory card, or a SSD.

27. A controller, for a flash memory module in a storage apparatus, wherein the flash memory module comprises a first flash memory and a second flash memory, the controller comprising:

a micro-processing unit;

a flash memory interface, electrically connected the micro-processing unit for accessing the flash memory module;

a buffer memory, electrically connected the micro-processing unit for temporarily storing data; and a memory management module, electrically connected the micro-processing unit for determining whether to start a block swapping operation of a wear leveling process in the first flash memory according to a first start-up condition and determining whether to start the block swapping operation in the second flash memory of the flash memory module according to a second start-up condition, wherein the first start-up condition is different from the second start-up condition, wherein when the first start-up condition is met, the memory management module performs the block swapping operation in the first flash memory, wherein when the second start-up condition is met, the memory management module performs the block swapping operation in the second flash memory, wherein the first flash memory is a SLC NAND flash memory, and the second flash memory is a MLC NAND flash memory.

28. The controller according to claim 27, wherein the first start-up condition is that a first erased number of the first flash memory is greater than a first threshold, and the second start-up condition is that a second erased number of the second flash memory is greater than a second threshold, wherein the first threshold is greater than the second threshold, and the memory management module resets the corresponding first erased number or second erased number after performing the block swapping operation.

29. The controller according to claim 28, wherein when the first start-up condition is met, the memory management module starts the block swapping operation in the first flash memory only when the memory management module determines that a write command of a host is a non-continuous command or a value gotten by subtracting the first threshold from the first erased number is greater than a predetermined upper limit and the start-up condition of the block swapping operation in the second flash memory is not met; and wherein when the second start-up condition is met, the memory management module starts the block swapping operation in the second flash memory only when the memory management module determines that the write command of the host is a non-continuous command or a value gotten by subtracting the second threshold from the second erased number is greater than the predetermined upper limit.

30. The controller according to claim 29, wherein when the first start-up condition and the second start-up condition are both met, the memory management module starts the block swapping operation earlier in the second flash memory than the memory management module starts the block swapping operation in the first flash memory.

31. The controller according to claim 27, wherein the storage apparatus is a USB flash disk, a flash memory card, or a SSD.

32. A controller, for a flash memory module in a storage apparatus, wherein the flash memory module comprises a first flash memory and a second flash memory, the controller comprising:

a micro-processing unit;

a flash memory interface, electrically connected the micro-processing unit for accessing the flash memory module;

a buffer memory, electrically connected the micro-processing unit for temporarily storing data; and a memory management module, electrically connected the micro-processing unit for respectively executing a first wear leveling process and a second wear leveling process in the first flash memory and the second flash memory of the flash memory module, wherein the first wear leveling process is different from the second wear leveling process, wherein the first flash memory is a SLC NAND flash memory, and the second flash memory is a MLC NAND flash memory.

33. The controller according to claim 32, wherein the memory management module executes the first wear leveling process to count a first erased number of the first flash memory, wherein when the first erased number is greater than a first threshold, a block in the first flash memory which is linked to a data area of the first flash memory is moved to a spare area of the first flash memory, a block in the first flash memory which is linked to the spare area is moved to the data area, and data in the block in the data area is copied to the block in the spare area.

34. The controller according to claim 32, wherein the memory management module executes the second wear leveling process to count an erased number of each of the blocks in the second flash memory and a second erased number of the second flash memory, wherein when the second erased number is greater than a second threshold, a block in the second flash memory which is linked to a data area of the second flash memory and has a relatively small erased number is moved to a spare area of the second flash memory, a block in the second flash memory which is linked to the spare area and has a relatively large erased number is moved to the data area, and data in the block in the data area which has the relative low erased number is copied to the block in the spare area which has the relatively large erased number.

35. The controller according to claim 32, wherein the storage apparatus is a USB flash disk, a flash memory card, or a SSD.

* * * * *